(12) United States Patent
Eckman et al.

(10) Patent No.: US 11,601,594 B2
(45) Date of Patent: *Mar. 7, 2023

(54) IMAGE SENSING ASSEMBLY

(71) Applicant: Lineage Logistics, LLC, Irvine, CA (US)

(72) Inventors: Christopher Frank Eckman, San Francisco, CA (US); Maxwell Micali, Berkeley, CA (US); Richard Frederick Warlich, Modesto, CA (US); Antonio Rocha, Turlock, CA (US); Ricky Paul Chin, Lathrop, CA (US)

(73) Assignee: Lineage Logistics, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/734,976

(22) Filed: May 2, 2022

(65) Prior Publication Data
US 2022/0272263 A1    Aug. 25, 2022

Related U.S. Application Data

(63) Continuation of application No. 17/009,623, filed on Sep. 1, 2020, now Pat. No. 11,323,624.

(51) Int. Cl.
*H04N 5/232* (2006.01)
*H04N 5/208* (2006.01)
*H04N 5/225* (2006.01)

(52) U.S. Cl.
CPC ......... *H04N 5/23264* (2013.01); *H04N 5/208* (2013.01); *H04N 5/2253* (2013.01)

(58) Field of Classification Search
CPC ............... H04N 5/23264; H04N 5/208; H04N 5/2253; H04N 13/204; G06K 9/00805;
(Continued)

(56) References Cited

U.S. PATENT DOCUMENTS 5,938,710 A    8/1999 Lanza et al.
6,628,339 B1 *  9/2003 Ferland ............... H04N 5/2253
                                              348/374
(Continued)

FOREIGN PATENT DOCUMENTS

EP    2197197      6/2010
GB    2380890      4/2003
JP    2003-212490  7/2003

OTHER PUBLICATIONS

Aethon.com' [online]. Spencer Allen, "Self-Driving Robot Navigation Methodology Explained," Oct. 27, 2016, [retrieved on Oct. 25, 2017], retrieved from: URL<http://www.aethon.com/our-navigation-methodology-explained/>, 7 pages.

(Continued)

*Primary Examiner* — Pritham D Prabhakher
(74) *Attorney, Agent, or Firm* — Fish & Richardson P.C.

(57) ABSTRACT

An image sensing assembly includes an enclosure that defines a first viewport aperture in a front wall of the enclosure. The image sensing assembly includes a first image sensor attached within the enclosure, the first image sensor aligned with the first viewport aperture in the front wall of the enclosure to capture image data representative of a scene viewed through the first viewport aperture. The image sensing assembly includes a bracket attached to the enclosure at a first portion of the bracket and attached to a first mounting plate at a second portion of the bracket. The image sensing assembly includes a vibration dampening mount located between the bracket and the first mounting plate to at least partially isolate the enclosure from vibration of the first mounting plate.

16 Claims, 9 Drawing Sheets

(58) Field of Classification Search
CPC ............ G06K 9/00771; G06K 9/00785; G06T 7/75; G06T 7/74; G06T 2207/10012; G06T 2207/30261; G06T 2207/30236; G06Q 10/0833; G06Q 50/28; G01S 5/16; G01S 3/00
USPC .......................................................... 348/157
See application file for complete search history.

(56) References Cited

U.S. PATENT DOCUMENTS

| | | | | |
|---|---|---|---|---|
| 6,956,615 | B2* | 10/2005 | Nakagishi | H04N 5/2253 348/374 |
| 7,839,451 | B2* | 11/2010 | Bleau | H04N 5/2252 348/340 |
| 8,502,914 | B2* | 8/2013 | Tanaami | H04N 5/2251 348/374 |
| 8,520,136 | B2* | 8/2013 | Hasegawa | H04N 5/2252 348/373 |
| 9,357,114 | B1 | 5/2016 | Whitehead et al. | |
| 9,797,988 | B2 | 10/2017 | Charvat et al. | |
| 9,952,485 | B1* | 4/2018 | Luski | G03B 17/561 |
| 9,965,856 | B2* | 5/2018 | Weiss | H04N 13/204 |
| 10,027,860 | B2 | 7/2018 | Hacker et al. | |
| 10,090,944 | B1 | 10/2018 | Charvat et al. | |
| 10,206,022 | B2* | 2/2019 | Owens | G06F 1/1632 |
| 10,222,575 | B2 | 3/2019 | Tremblay | |
| 10,242,273 | B1 | 3/2019 | Eckman | |
| 10,365,671 | B1 | 7/2019 | Nelson et al. | |
| 10,528,828 | B2 | 1/2020 | Eckman | |
| 10,588,178 | B1 | 3/2020 | Nelson et al. | |
| 10,696,277 | B1 | 6/2020 | Rakouki | |
| 10,744,957 | B2 | 8/2020 | Oikawa et al. | |
| 10,852,858 | B2* | 12/2020 | Paik | G06F 3/0393 |
| 10,884,320 | B2* | 1/2021 | Tang | G03B 17/561 |
| 11,105,101 | B2* | 8/2021 | Stary | E04C 2/38 |
| 2002/0003571 | A1 | 1/2002 | Schofield et al. | |
| 2003/0214733 | A1 | 11/2003 | Fujikawa et al. | |
| 2005/0285973 | A1* | 12/2005 | Singh | H04N 5/2253 348/340 |
| 2007/0216655 | A1* | 9/2007 | Chen | G06F 1/1656 345/173 |
| 2009/0073308 | A1* | 3/2009 | Bleau | H04N 5/2252 348/373 |
| 2011/0233248 | A1 | 9/2011 | Flemming et al. | |
| 2012/0039023 | A1* | 2/2012 | Renwick | G06F 3/0202 361/679.01 |
| 2013/0096735 | A1 | 4/2013 | Byford et al. | |
| 2013/0325244 | A1 | 12/2013 | Wang et al. | |
| 2014/0055611 | A1 | 2/2014 | Wong et al. | |
| 2015/0347840 | A1 | 12/2015 | Iida | |
| 2016/0090285 | A1 | 3/2016 | Svensson et al. | |
| 2016/0123657 | A1 | 5/2016 | Kim et al. | |
| 2016/0231527 | A1 | 8/2016 | Tremblay | |
| 2016/0373844 | A1* | 12/2016 | Owens | H04R 1/028 |
| 2017/0036647 | A1 | 2/2017 | Zhao et al. | |
| 2017/0066459 | A1 | 3/2017 | Singh | |
| 2017/0070651 | A1 | 3/2017 | Hacker et al. | |
| 2018/0029797 | A1 | 2/2018 | Hance et al. | |
| 2018/0210161 | A1 | 7/2018 | Park et al. | |
| 2018/0231651 | A1 | 8/2018 | Charvat | |
| 2018/0239010 | A1 | 8/2018 | Mindell et al. | |
| 2018/0244204 | A1 | 8/2018 | Boehm | |
| 2019/0064885 | A1* | 2/2019 | Paik | G06F 1/1669 |
| 2019/0370567 | A1 | 12/2019 | Eckman | |
| 2020/0218912 | A1 | 7/2020 | Eckman et al. | |
| 2021/0054991 | A1* | 2/2021 | Stary | E04C 2/38 |

OTHER PUBLICATIONS

D'Alfonso et al., "A SLAM algorithm for indoor mobile robot localization using an Extended Kalman Filter and a segment based environment mapping," Advanced Robotics (ICAR), 2013 16th International Conference on Nov. 25, 2013 (pp. 1-6).

Fioraio et al., "Realtime Visual and Point Cloud SLAM," Proc. of the RGB-D workshop on advanced reasoning with depth cameras at robotics: Science and Systems Conf.(RSS) Jun. 2011 (vol. 27).

International Search Report and Written Opinion in International Appln. No. PCT/US2021/048769, dated Nov. 18, 2021, 9 pages.

Lemaire et al., "Vision-based SLAM: Stereo and Monocular Approaches," International Journal of Computer Vision, Sep. 1, 2007, 74(3):343-64.

Varga et al., "Improved Autonomous Loading Handling with Stereo Cameras," Intelligent Computer Communication and Processing (ICCP), 2015 IEEE International Conference on Sep. 3, 2015 (pp. 251-256).

* cited by examiner

IMAGE SENSING ASSEMBLY

This application is a continuation application of U.S. patent application Ser. No. 17/009,623, filed Sep. 1, 2020, which is incorporated by reference herein in its entirety.

TECHNICAL FIELD

This document generally relates to an image sensing assembly that includes an image sensor, an enclosure for the image sensor, and a mounting system for the enclosure.

BACKGROUND

Some warehouses include cold storage rooms in which refrigerated or frozen products are stored. Lift trucks (e.g., forklifts) working within such warehouses experience harsh working environments. For example, as lift trucks transition from cold storage rooms to non- or less-refrigerated portions of the warehouses, changing environmental conditions (e.g., differing temperatures and/or humidity levels) can cause condensation to form on the lift trucks and components thereof.

Lift trucks can also experience significant vibration due to the industrial environment in which they operate. For example, rough warehouse floors or transitions between different portions of the warehouse can jar the lift trucks, and the lift trucks may occasionally impact stationary objects or other lift trucks. The harsh environments in warehouses affect not only the lift trucks but also components attached thereto.

Identifying the location of a lift truck in a warehouse can enable a computing system to track the position and movement of the lift truck. A Global Positioning System device may not work well in the indoor environment of a warehouse. Moreover, adding location-identifying beacons throughout large warehouses may be prohibitively expensive.

SUMMARY

This document describes an image sensing assembly. The image sensing assembly can be mounted to a lift truck used in a warehouse or other type of storage facility. Images captured by the image sensing assembly as the lift truck moves around the warehouse can be analyzed to determine positions of the lift truck at different points in time. The position information can be correlated with information that identifies goods moved by the lift truck at certain times, enabling a computing system to identify the location of goods stored within the warehouse.

The image sensing assembly may be sealed to protect against condensation formed on an exterior of the image sensing assembly. For example, the image sensing assembly may include an enclosure to isolate an image sensor and other electronics housed within the enclosure from an exterior environment.

The image sensing assembly can have a robust construction to tolerate vibration and shock. Dampening mounts may isolate the enclosure that houses electronics from a mounting portion of the image sensing assembly that connects to a lift truck. Such dampening mounts may at least partially limit the intensity of vibration imparted to an image sensing assembly from a lift truck, which can increase the quality of images captured by the image sensing assembly.

To limit the possibility of ingress of condensation and particulate matter into the interior of the enclosure, the enclosure may include a limited number of apertures. The apertures in the enclosure may be sealed, for example, with gaskets. As an example, the fasteners that extend through at least some of the apertures may include integral O-rings. To further limit ingress and still provide serviceable access to the interior of the enclosure, the enclosure may be formed of only two portions, a front portion and a rear portion that are removably attachable to each other.

A gasket may at least partially separate the front portion and the rear portion from each other, to increase a quality of the seal formed when the front and rear portions are attached together. Fasteners (e.g., clamp screws) that fasten the front portion and the rear portion together may be located outside a periphery of the gasket so that condensation and particulate ingress around the fasteners will not end up inside the enclosure.

The apertures in the enclosure may be formed only in a front wall of the enclosure (provided by the front portion of the enclosure) and a rear wall of the enclosure (provided by the rear portion of the enclosure), to enable rapid and cost-efficient tooling during production of the enclosure. In other words, a single CNC milling, waterjet, or laser operation may form all apertures in the front wall of the enclosure, and a single CNC milling, waterjet, or laser operation may form all apertures in the rear wall of the enclosure. Apertures may not be formed in side walls that connect the front wall of the enclosure to the rear wall of the enclosure.

One or more image sensors may be mounted to a first circuit board, and the first circuit board may be fastened to the front portion of the enclosure on the inside of the enclosure. Wireless transceiver circuitry for communicating image data to a remote computing system may be mounted to a second circuit board, and the second circuit board may be fastened to the rear portion of the enclosure on the inside of the enclosure.

These two circuit boards may be electrically connected to each other by a single communications and power cable, such as a USB cable. Connecting the two circuit boards with a single cable can enable relatively straightforward separation of the front portion of the enclosure (and therefore the first circuit board) from the rear portion of the enclosure (and therefore the second circuit board). The ability to fully separate the front portion of the enclosure from the rear portion of the enclosure facilitates servicing of components housed within the enclosure of the image-sensing assembly.

An antenna to wirelessly transmit signals encoding image data that is captured by the image sensor can be located at least partially outside the enclosure. The antennas can electrically couple to the wireless transceiver circuitry on the inside of the enclosure to enhance wireless transmission capabilities of the image-sensing assembly.

The enclosure may mount to various different types of lift trucks using a sandwich mount attached to the enclosure using a bracket system. One or more vibration dampening mounts may isolate the sandwich mount from the sandwich mount, thereby limiting the amount of vibration and shock transferred from a frame of the lift truck to the enclosure. The sandwich mount enables easy and reliable attachment to various portions of a lift truck, for example, the protective bars of the roof grate that is located above the operator compartment of a lift truck. The implementations described throughout this disclosure can realize the aforementioned and other advantages.

As additional description to the embodiments described below, the present disclosure describes the following embodiments.

Embodiment 1 is an image-sensing assembly that includes an enclosure that defines a first viewport aperture in a front wall of the enclosure. The image sensing assembly includes a first image sensor attached within the enclosure, the first image sensor aligned with the first viewport aperture in the front wall of the enclosure to capture image data representative of a scene viewed through the first viewport aperture. The image sensing assembly includes a bracket attached to the enclosure at a first portion of the bracket and attached to a first mounting plate at a second portion of the bracket. The image sensing assembly includes a vibration dampening mount located between the bracket and the first mounting plate to at least partially isolate the enclosure from vibration of the first mounting plate.

Embodiment 2 is the image-sensing assembly of embodiment 1, wherein a back wall of the enclosure defines multiple bracket fastening apertures; and the bracket is removably attached to the enclosure at the back wall of the enclosure using multiple bracket fastening fasteners that pass through the multiple bracket fastening apertures.

Embodiment 3 is the image-sensing assembly of embodiment 2, wherein the first portion of the bracket is angled with respect to the second portion of the bracket at a first angle; and the back wall of the enclosure is angled with respect to the first mounting plate at the first angle.

Embodiment 4 is the image-sensing assembly of embodiment 3, wherein: the first angle is approximately 90 degrees; the enclosure includes a side wall located between the front wall of the enclosure and the back wall of the enclosure; and the first mounting plate is oriented parallel to the side wall of the enclosure.

Embodiment 5 is the image-sensing assembly of embodiment 3, wherein: the image-sensing assembly further comprises a second mounting plate removably attached to the first mounting plate with multiple mounting plate fastening fasteners; the first mounting plate, the second mounting plate, and the multiple mounting plate fastening fasteners form a sandwich mount; and the first mounting plate and the second mounting plate are oriented parallel to each other.

Embodiment 6 is the image-sensing assembly of embodiment 3, wherein: the image-sensing assembly further comprises a second mounting plate and a third mounting plate that are attached to the first mounting plate with a bracket; the second mounting plate is removably attached to the third mounting plate with multiple mounting plate fasteners; and the second mounting plate, the third mounting plate, and the multiple mounting plate fasteners form a sandwich mount.

Embodiment 7 is the image-sensing assembly of embodiment 6, wherein: the second mounting plate and the third mounting plate are oriented parallel to each other; and the first mounting plate is oriented perpendicular to both the second mounting plate and the third mounting plate.

Embodiment 8 is the image-sensing assembly of any one of embodiments 1-7, wherein: the enclosure includes a front portion and a rear portion releasably attachable to each other to enclose an interior of the enclosure; the image-sensing assembly further comprises a gasket to seal the front portion of the enclosure to the rear portion of the enclosure, the gasket surrounding the interior of the enclosure; the enclosure defines multiple enclosure fastening apertures; the image-sensing assembly further comprises multiple enclosure fastening fasteners that pass through the multiple enclosure fastening apertures to releasably attach the font portion of the enclosure to the rear portion of the enclosure; and the multiple enclosure fastening fasteners are positioned outside of the gasket such that the multiple enclosure fastening apertures are positioned outside the interior of the enclosure.

Embodiment 9 is the image-sensing assembly of any one of embodiments 1-8, wherein: the enclosure defines a second viewport aperture in the front side of the enclosure; the image-sensing assembly further comprises a second image sensor attached within the enclosure; and the second image sensor is aligned with the second viewport aperture in the front side of the enclosure.

Embodiment 10 is the image-sensing assembly of any one of embodiments 1-7 and 9, further comprising: a first circuit board to which the first image sensor is attached, the first circuit board located within the enclosure and removably attachable to the front wall of the enclosure with multiple first circuit board fastening fasteners; wireless transmission circuitry to transmit the image data captured by the first image sensor; and a second circuit board to which the wireless transmission circuitry is attached, the second circuit board located within the enclosure and removably attached to a back wall of the enclosure opposite from the front wall of the enclosure with multiple second circuit board fastening fasteners, and wherein the enclosure includes a front portion and a rear portion releasably attached to each other, the front portion including the front wall and the rear portion including the rear wall.

Embodiment 11 is the image-sensing assembly of embodiment 10, further comprising a communication cable that communicatively connects the first circuit board to the second circuit board to transmit the image data captured by the first image sensor to the wireless transmission circuitry, the communication cable being releasably attached to the first circuit board or the second circuit board.

Embodiment 12 is the image-sensing assembly of embodiment 11, wherein: the rear portion of the enclosure defines an antenna receiving aperture; and the wireless transmission circuitry includes an antenna that communicatively connects to the second circuit board and that extends through the antenna receiving aperture so that at least part of the antenna is located external to the enclosure.

Embodiment 13 is the image-sensing assembly of embodiment 12, wherein: the rear portion of the enclosure defines a power-supply receiving aperture;

the image-sensing assembly further comprises a power supply cable or terminal to receive power from a power source external to the enclosure; and the power supply cable or terminal extends at least partially through the power-supply receiving aperture.

Embodiment 14 is the image-sensing assembly of any one of embodiments 1-13, further comprising: a thermally conductive plate that defines a second viewport aperture, the thermally conductive plate attached within the enclosure between the first image sensor and the front wall of the enclosure such that the second viewport aperture in the thermally conductive plate aligns with the first image sensor and the first viewport aperture in the front wall of the enclosure; and a heating element thermally connected to the thermally conductive plate.

Embodiment 15 is the image-sensing assembly of embodiment 14, further comprising a transparent panel positioned between the image sensor and the front wall of the enclosure, the transparent panel aligned with the first image sensor, the first viewport aperture in the front wall of the enclosure, and the second viewport aperture in the thermally conductive plate.

Embodiment 16 is the image-sensing assembly of embodiment 15, wherein the transparent panel is positioned between the front wall of the enclosure and the thermally conductive plate.

Embodiment 17 is the image-sensing assembly of embodiment 15, wherein: the front wall of the enclosure defines a first heater-assembly fastening aperture; the transparent panel defines a second heater-assembly fastening aperture; the thermally conductive plate defines a third heater-assembly fastening aperture; a heater-assembly fastener extends through the first heater-assembly fastening aperture, the second heater-assembly fastening aperture, and the third heater-assembly fastening aperture to fasten the transparent panel and the thermally conductive plate to the front wall of the enclosure.

Embodiment 18 is an image-sensing assembly. The image-sensing assembly includes an enclosure that includes a front portion and a rear portion releasably attached to each other to enclose an interior of the enclosure, the front portion of the enclosure defining a first viewport aperture and a second viewport aperture in a front wall of the enclosure, the back portion of the enclosure defining multiple bracket fastening apertures in a back wall of the enclosure opposite from the front wall of the enclosure, the enclosure defining multiple enclosure fastening apertures. The image-sensing assembly includes a gasket to seal the front portion of the enclosure to the rear portion of the enclosure, the gasket surrounding the interior of the enclosure. The image-sensing assembly includes multiple enclosure fastening fasteners to pass through the multiple enclosure fastening apertures to releasably attach the font portion of the enclosure to the rear portion of the enclosure. The image-sensing assembly includes a first circuit board removably attached to the front wall of the enclosure with multiple first circuit board fastening fasteners. The image-sensing assembly includes a first image sensor attached within the enclosure to the first circuit board, the first image sensor aligned with the first viewport aperture in the front wall of the enclosure. The image-sensing assembly includes a second image sensor attached within the enclosure to the first circuit board, the second image sensor aligned with the second viewport aperture in the front wall of the enclosure. The image-sensing assembly includes a thermally conductive plate that defines a third viewport aperture and a fourth viewport aperture, the thermally conductive plate attached within the enclosure between (i) the first image sensor and the second image sensor, and (ii) the front wall of the enclosure such that the third viewport aperture in the thermally conductive plate aligns with the first image sensor and the first viewport aperture in the front wall of the enclosure, and such that the fourth viewport aperture in the thermally conductive plate aligns with the second image sensor and the second viewport aperture in the front wall of the enclosure. The image-sensing assembly includes a heating element thermally connected to the thermally conductive plate to heat the thermally conductive plate. The image-sensing assembly includes a second circuit board located within the enclosure and removably attached to the back wall of the enclosure with multiple second circuit board fastening fasteners. The image-sensing assembly includes wireless transmission circuitry to transmit the image data captured by the first image sensor, the wireless transmission circuitry attached to the second circuit board. The image-sensing assembly includes a communication cable that communicatively connects the first circuit board to the second circuit board to transmit the image data captured by the first image sensor to the wireless transmission circuitry, the communication cable being releasably attached to the first circuit board or the second circuit board. The image-sensing assembly includes a bracket removably attached to the back wall of enclosure at a first portion of the bracket using multiple bracket fastening fasteners that pass through the multiple bracket fastening apertures. The image-sensing assembly includes a first mounting plate attached to the bracket at a second portion of the bracket, the first portion of the bracket being angled with respect to the second portion of the bracket at a first angle, and the back wall of the enclosure being angled with respect to the first mounting plate at the first angle. The image-sensing assembly includes a vibration dampening mount located between the bracket and the first mounting plate to at least partially isolate the enclosure from vibration of the first mounting plate.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

This document generally describes an image sensing assembly that includes an image sensor, an enclosure for the image sensor, and a mounting system for the enclosure. The image sensing assembly can be mounted to a lift truck or other type of vehicle, and used to capture image data and wirelessly transmit the captured image data to a remote computing system, for example, over a Wi-Fi network. The remote computing system can analyze the images to identify a location and orientation of the lift truck. The analysis may include analyzing the images to identify objects in the environment that have known locations, for example, surveyed markers and natural features with fixed locations.

The image sensing assembly is constructed to withstand conditions encountered by a lift truck in a warehouse, including vibration and substantial temperature swings (e.g., from −29 C to +21 C). The enclosure that contains the image sensor and other electronics therein separates into two portions to allow servicing components inside the enclosure.

A first circuit board to which the image sensor is attached is fixed to a front portion of the two-part enclosure, while a second circuit board to which wireless transmission circuitry and an inertial measurement unit (IMU) is attached is fixed to a rear portion of the two-part enclosure.

An aperture in the enclosure with which the image sensor is aligned is covered with a transparent panel. The image sensing assembly may include a heating assembly to heat the transparent panel, which can limit the formation of condensation on the transparent panel and increase the likelihood that the image sensor captures high-fidelity images. The transparent panel may be coated with a hydrophobic material to cause any water droplets forming on the transparent panel to spread across the panel into a thin film. Additional features of the image sensing assembly and advantages thereof are described throughout this disclosure, for example, with reference to FIGS. 1-9 below.

Enclosure

Figure 1:
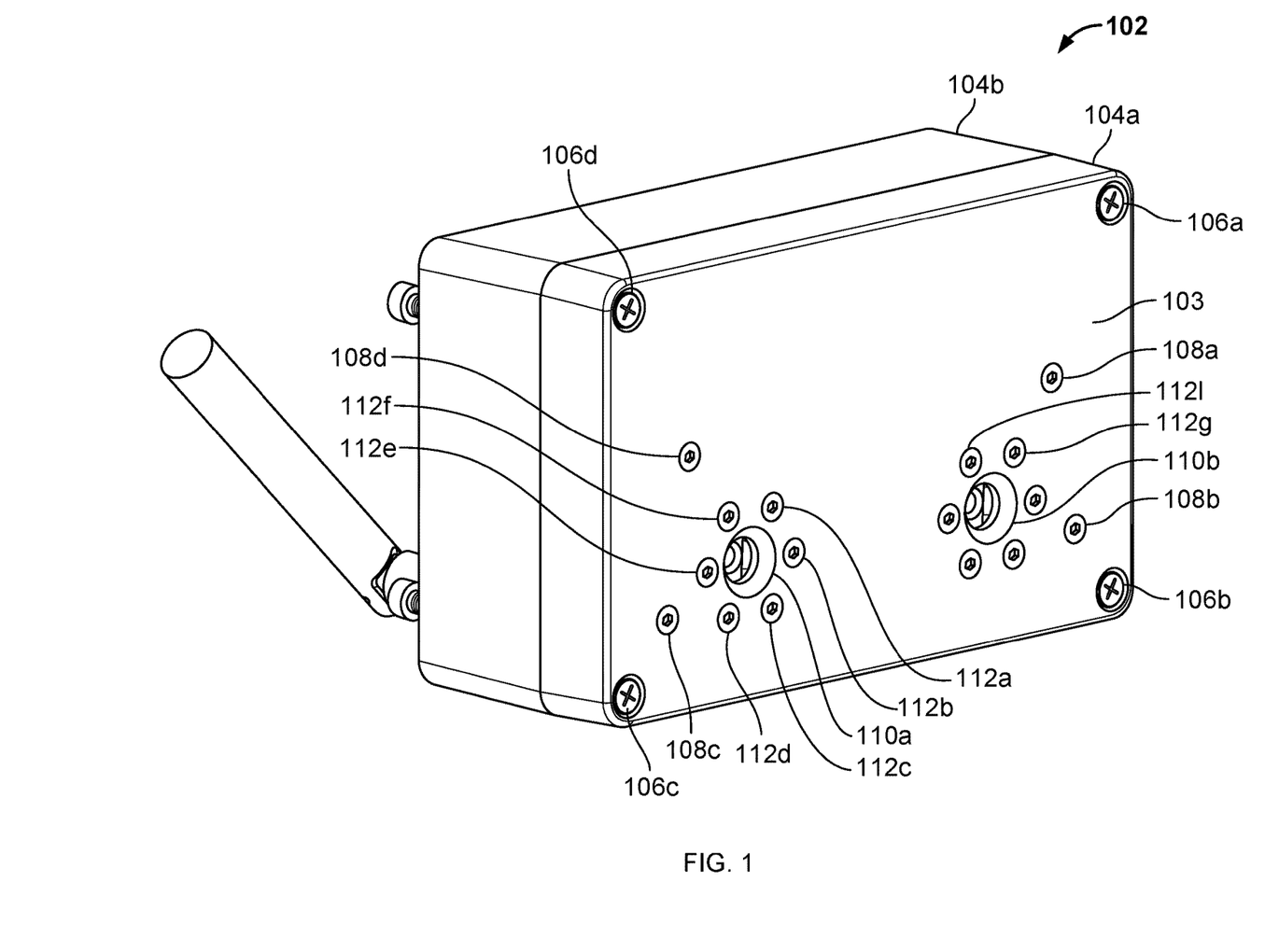
FIG. 1 shows a perspective view of an enclosure that illustrates a front side of the enclosure.

FIG. 1 shows a perspective view of the enclosure 102 that illustrates a front side 103 of the enclosure. The enclosure 102 is formed of a front portion 104a and a rear portion 104b that removably attach to each other with four fasteners 106a-d (e.g., clamp screws) inserted through apertures 107a-d (FIG. 3) at the corners of the front side 103 of the enclosure.

Figure 3:
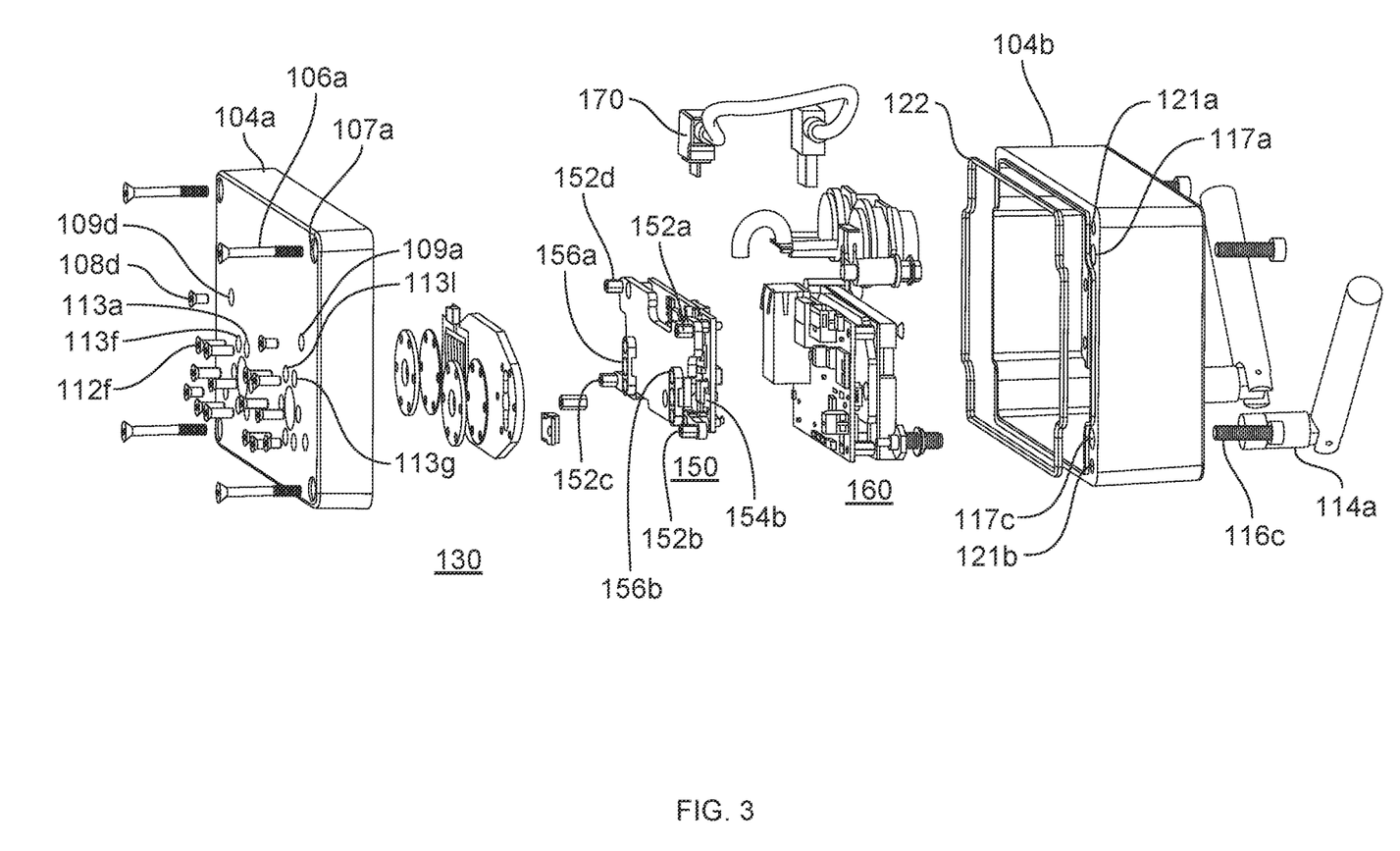
FIG. 3 shows an exploded view diagram of the enclosure.

FIG. 3 shows an exploded view of the enclosure 102 that illustrates how the fasteners 106a-d are inserted through the apertures 107a-d that extend through the corners of the front portion 104a. The fasteners 106a-d thread into threaded apertures 121a-d that extend into but do not extend through the rear portion 104b of the enclosure. Each of the apertures 107a-d are chamfered on the front side 103 of the enclosure, so that the fasteners 106a-d are countersunk and top surfaces of the fasteners 106a-d rest substantially flush with the front side 103 of the enclosure.

A gasket 122 seals the front portion 104a with the rear portion 104b, to limit water, dust, and other potential contaminants from ingress into an interior of the enclosure 102. The gasket 122 surrounds the interior of the enclosure 102, although the fasteners 106a-d and apertures 107a-d and apertures 121a-d are not surrounded by the gasket 122, and instead are located outside a periphery of the gasket 122. As such, any liquid or other material that passes into or through apertures 107a-d and/or 121a-d should not make its way into the interior of the enclosure 102. The gasket 122 may be flat at may be made of materials such as paper, rubber, silicone, metal, cork, felt, neoprene, plastic, or fiberglass. The enclosure 102 may be made of plastic, aluminum (e.g., cast aluminum), steel, or other impact resistant materials.

The front side 103 of the enclosure 102 includes multiple apertures in addition to those through which the fasteners 106a-d are inserted. For example, the front side 103 of the enclosure 102 includes four apertures 109a-d (see FIG. 3) through which fasteners 108a-d are inserted. The fasteners 108a-d extend through apertures 109a-d and into threaded receptacles 152a-d that are attached to the camera board assembly 150. As such, the fasteners 108a-d fasten the camera board assembly 150 to the front portion 104a of the enclosure 102. Apertures 109a-d are chamfered so that top surfaces of the fasteners 108a-d sit flush with the front side 103 of the enclosure 102. The fasteners 108a-d may be M3 (3 mm wide) countersunk screws.

The front side 103 of the enclosure 102 also includes two camera viewport apertures 110a-b to allow light to access two image sensors 154a-b. The two apertures 110a-b are larger than the other apertures, and no fasteners extend through the apertures 110a-b. Each of the apertures 110a-b are 10 mm in diameter, chamfered by 45 degrees to provide a wide field of view for the image sensors 154a-b.

When the image sensing assembly is assembled, between the apertures 110a-b and the image sensors 154a-b are components of the window/heater assembly 130, including transparent panels to protect the image sensors 154a-b from ingress of contaminants. The window/heater assembly 130 also includes heating components to limit the amount of condensation that forms on the transparent panels. Additional details of the window/heater assembly 130 are provided below with respect to FIG. 4.

The final set of twelve apertures in the front side 103 of the enclosure include six apertures 113a-f through which six fasteners 112a-f surrounding aperture 110a are inserted, and six apertures 113g-l through which six fasteners 113g-l surrounding aperture 110b are inserted. These twelve fasteners (six surrounding aperture 110a and six surrounding aperture 110b) pass through the front side 103 of the enclosure 102 and thread into components of the window-heater assembly 130, to retain the window-heater assembly 130 to the front side 103 of the enclosure 102, as described in additional detail with respect to FIG. 4.

Each set of six fasteners is equally spaced around its respective aperture 110a-b in a hexagonal pattern, and is chamfered so that the top surfaces of the fasteners sit flush with the surface of the enclosure 102. The fasteners 112a-l may be M3 countersunk screws.

Figure 2:
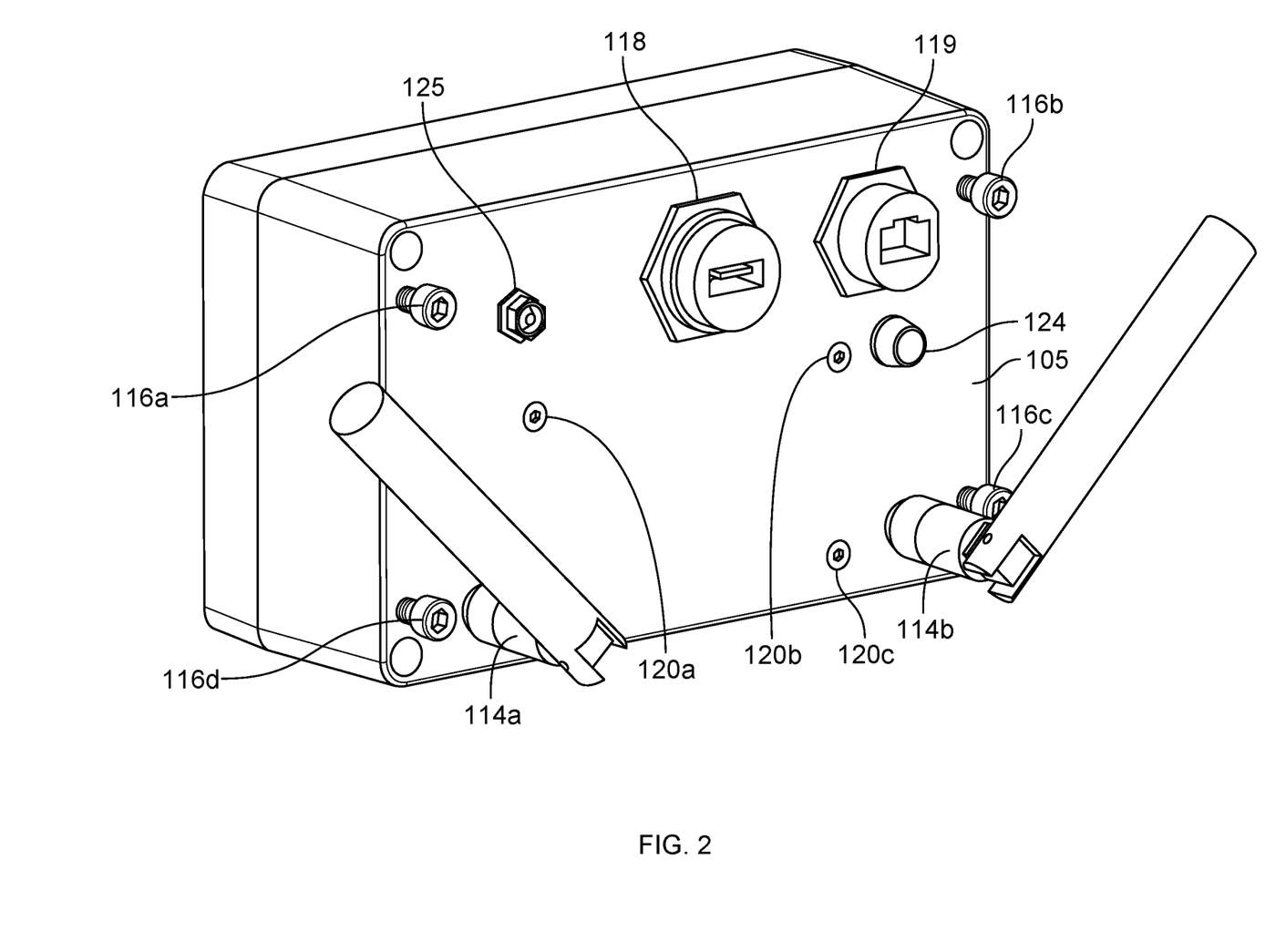
FIG. 2 shows a perspective view of an enclosure that illustrates a rear side of the enclosure.

FIG. 2 shows a perspective view of the enclosure 102 that illustrates a rear side 105 of the enclosure. The rear portion 104b of enclosure 102 includes the rear side 105, which defines fourteen apertures through which either electronic components or fasteners pass. Four fasteners 116a-d thread into four apertures 117a-d (see FIG. 3) to fasten one or more mounting brackets to the enclosure 102. Each of the apertures 117a-d may extend entirely through the rear portion 104b of enclosure 102, as shown by the openings to apertures 117a-b that are illustrated in FIG. 3. The fastening of one or more brackets to the enclosure 102 is described in additional detail below with respect to FIGS. 5-8.

The rear portion 104b of the enclosure 102 defines four apertures (not labelled) through which four fasteners 120a-d pass to attach the wireless transmission circuit board 160 to the rear portion 104b. The wireless transmission circuit board 160 may include four threaded receptacles (not shown) into which the fasteners 120a-d are threaded, for example, similar to the threaded receptacles 152a-d on the camera board assembly 150. The four apertures in the rear portion 104b through which fasteners 120a-d are inserted may be chamfered so that the top surfaces of the fasteners 120a-d sit flush with the rear side 105. The fasteners 120a-d may be M3 countersunk screws.

The rear portion 104b of enclosure 103 also includes five additional apertures (not labelled) through which five corresponding electronic components pass, including a power input receptacle 125, a USB receptacle 118, an Ethernet receptacle 119, an LED light 124, and two antennas 114a-b. In some examples, the antennas 114a-b may be stubby antennas. Each of these electronic components electrically connects with the wireless transmission circuit board 160 and/or the camera board assembly 150, as described throughout this disclosure, for example, with respect to schematic diagram shown in FIG. 9.

Window/Heater Assembly 130

Figure 4:
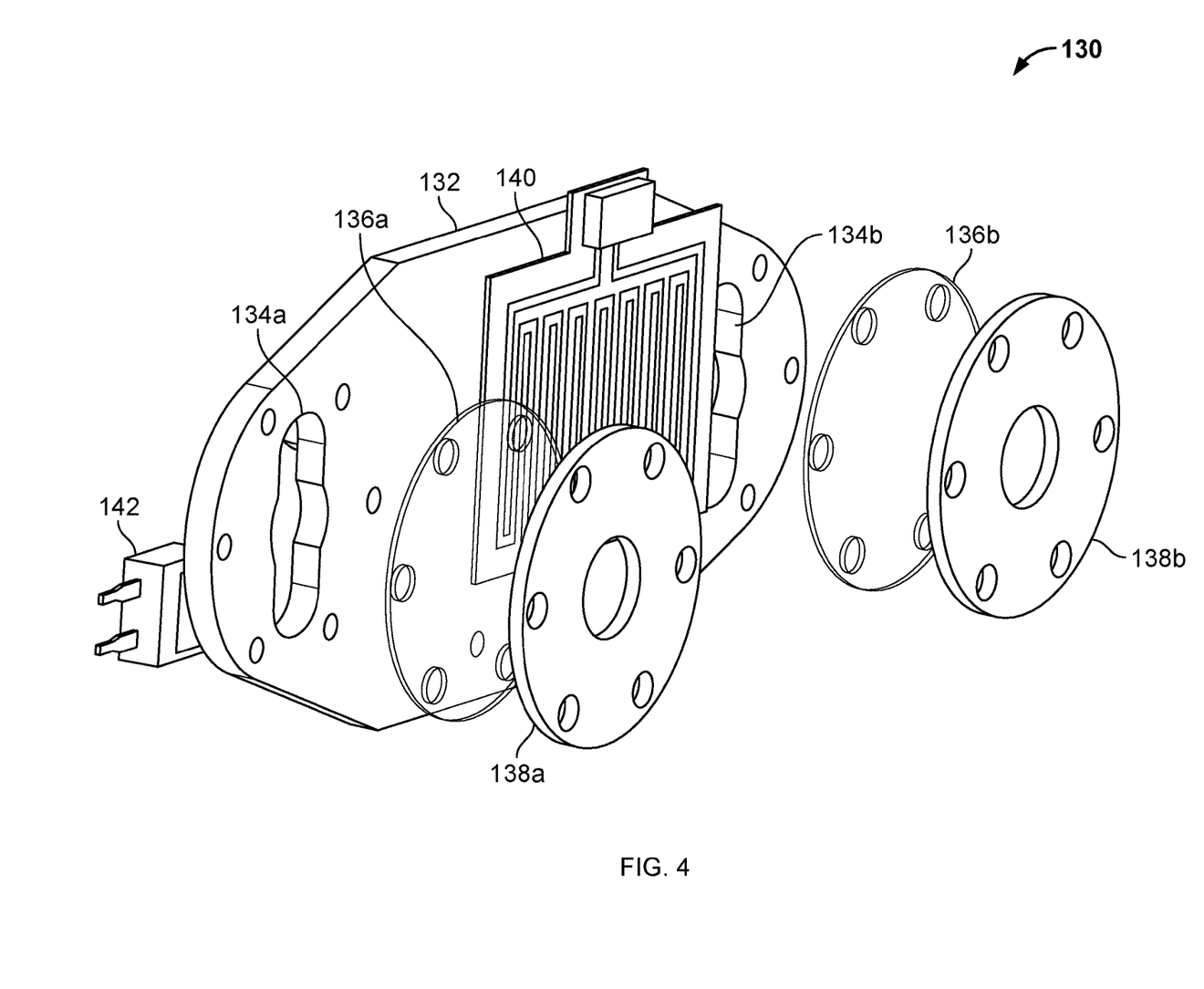
FIG. 4 shows an exploded view diagram of the window/heater assembly.

FIG. 4 shows an exploded view diagram of the window/heater assembly 130. Due to the possibility of liquid and particulate ingress into the interior of the enclosure 102 through camera viewport apertures 110a-b, transparent panels 136a-b are fastened to a rear surface of the front portion 104a to seal an interior of the enclosure 102 from the exterior of the enclosure 102, yet to enable light to reach the image sensors 154a-b. Between the transparent panels 136a-b and the rear surface of the front portion 104a are window insulators/seals 138a-b. The window insulators/seals 138a-b provide a sealing interface between the transparent panels 136a-b and the rear surface of the front portion 104a-b. The window insulator/seals 138a-b also insulate the transparent panels 136a-b from the potentially different temperature of the front side 104a of the enclosure 102.

The transparent panels 136a-b may be formed of plastic, acrylic, glass, or another transparent material. The window seals 138a-b may be formed of a material such as paper, rubber, silicone, metal, cork, felt, neoprene, plastic, or fiberglass. The transparent panels 136a-b and the seals 138a-b are illustrated in the figures as being located on the interior of the enclosure 102, but the transparent panels 136a-b and the seals 138a-b may be located on the exterior of the enclosure 102, for example, in contact with the front surface 103 of the enclosure 102.

A difficulty with operating a camera assembly on a lift truck that passes between warm and cold temperature environments is that the changing ambient temperature surrounding the lift truck can result in the temperature on a lens or transparent panel of the camera assembly being a different temperature than the ambient environment. This difference in temperature can cause the formation of condensation on the lens or transparent window of the camera assembly.

To limit the formation of condensation on the inside of the enclosure, one or more desiccant packs may be placed inside the enclosure 102 and all apertures into the enclosure 102 may be sealed so that moisture cannot enter the enclosure 102. To limit the formation of condensation on the transparent panels 136a-b that form part of the outside of the enclosure 102, the transparent panels 136a-b are heated to minimize a difference between the temperature of the transparent panels 136a-b and a temperature of the ambient external environment. The exterior and/or interior surface of the transparent panels 136a-d may be coated with a hydrophobic material to limit the formation of water droplets.

To heat the transparent panels 136a-b, the transparent panels 136a-b are fastened directly or indirectly to a heat distributor plate 132 that is heated with a heater 140 (e.g., a 6 W patch heater). The heater 140 may be fastened or adhered to the heat distributor plate 132, either directly or indirectly. Heat generated by the heater 140 warms the heat distributor plate 132, which acts as a heat sink to steadily and evenly supply heat to both of the transparent panels 136a-b. There may be no thermal isolating element between the transparent panels 136a-b and the heat distributor plate 132. Indeed, the transparent panels 136a-b may be fastened in direct contact with the distributor plate 132.

A thermal switch 142 may turn power on and off to the heater 140, and may be controlled by an external controller. Alternatively, the thermal switch 142 may include therein or attached thereto a heat sensor such as a thermistor and electronics configured to activate the switch when the thermistor achieves a certain resistance. The thermal switch 142 may be attached to a rear surface of the heat distributor plate 132, although the thermal switch 142 could be located elsewhere inside the enclosure 102.

The heat distributor plate 132 includes two large apertures 134a-b into which portions of the image sensors 154a-b (e.g., a lens portion of each image sensor) may partially or fully extend. The large apertures 134a-b are irregularly shaped to receive an irregularly-shaped housing 156a-b that surrounds the lens portion of each of the image sensors 154a-b. The housing 156a-b for the lens portion of each image sensor therefore sits within and contacts the heat distributor plate 132. This contact can allow the image sensors 154a-b and optical lens components of the image sensors 154a-b to be heated, similar to how the transparent panels 136a-b are heated.

The window/heater assembly 130 is fastened to a rear surface of the front portion 104a of the enclosure 102 with the twelve fasteners 112a-1 introduced earlier in this disclosure. These twelve fasteners 112a-1 pass through or into twelve corresponding apertures in each of (1) the front portion 104 of the enclosure 102, (2) the seals 138a-b, (3) the transparent panels 136a-b, and the (4) the heat distributor plate 132. Threads of the twelve fasteners may engage with threads tapped into the twelve apertures of the heat distributor plate 132, or nuts located behind the heat distributor plate 132. The twelve fasteners 112a-l may not thread into any component of the camera board assembly 150. In other words, the camera board assembly 150 and the window/heater assembly 130 may separately attach to the front portion 104a of the enclosure 102. The only direct contact between the window/heater assembly 130 and the camera board assembly 150 may be via the housings 156a-b, which seat within the apertures 134a-b.

Mounting Systems

The image sensing assembly may be mounted to a lift truck via a mounting system. This disclosure describes two different types of mounting systems for two different types of lift trucks.

Figure 5:
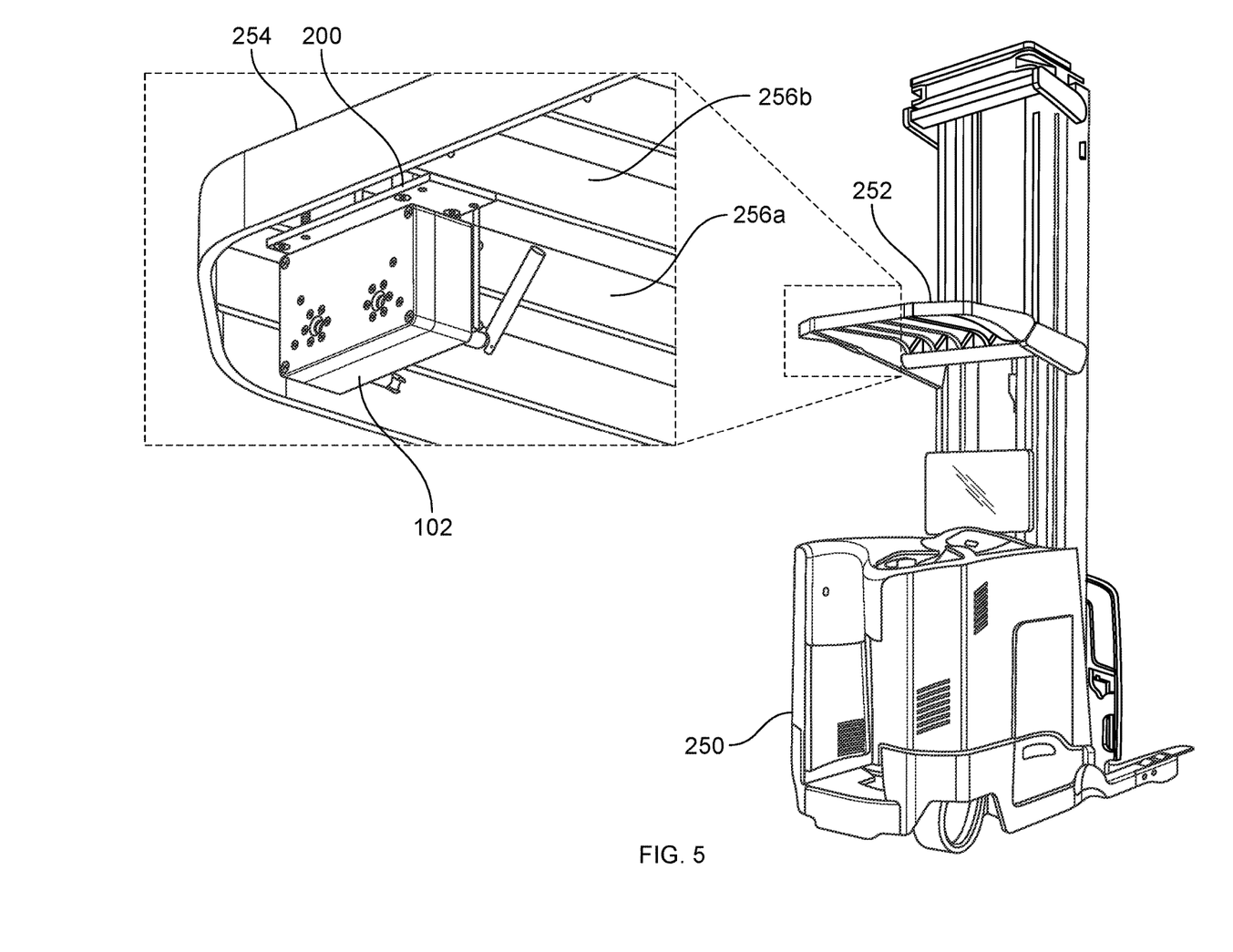
FIGS. 5 and 6 show a first mounting system designed to attach the enclosure to a high lift truck.
Figure 6:
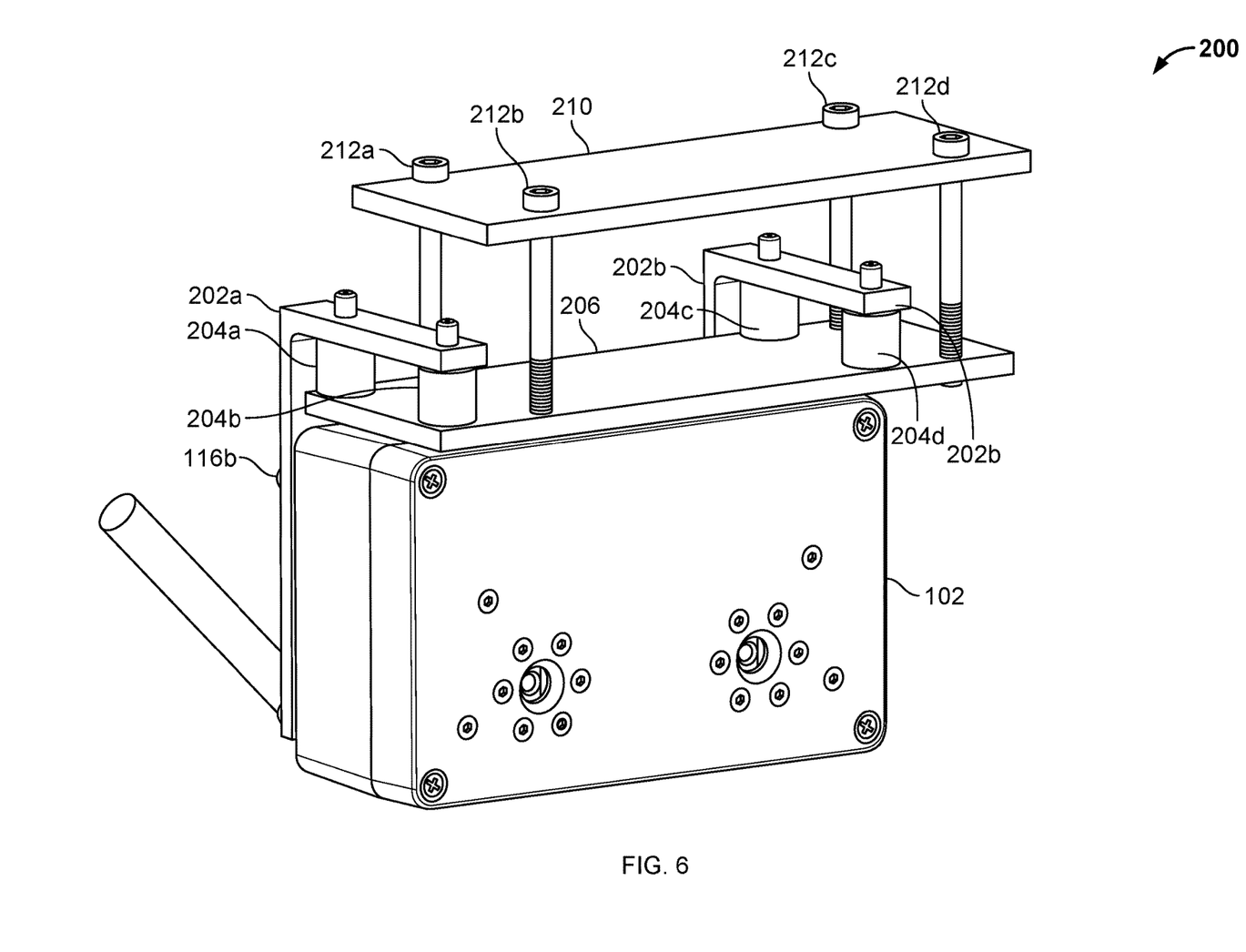

FIGS. 5 and 6 show a first mounting system 200 designed to attach the enclosure 102 to a high lift truck 250. The first mounting system 200 attaches to a high lift truck 250 at protective roof grate 252 that is cantilevered above an operator compartment of the high lift truck 250. The protective roof grate 252 includes vertically-oriented bars 256a-b that attach at a perpendicular orientation to another vertically-oriented bar 254. The first mounting system attaches to the vertically-oriented bars 256a-b using a sandwich mount that comprises plates 206 and 210. Plates 206 and 210 are fastened together using fasteners 212a-d that pass through corresponding smooth bore apertures in plate 210 and corresponding threaded apertures in plate 206. The fasteners 212a-d may be tightened to draw plates 206 and 210 together, to squeeze plates 206 and 210 around the vertically-oriented bars 256a-b.

A portion of the mounting system 200 that interfaces with the enclosure 102 includes brackets 202a-b. The brackets 202a-b attach to the rear portion 104b of the enclosure 102 with fasteners 116a-d that interface with corresponding apertures in the brackets 202a-b. The brackets 202a-b are illustrated as right-angle brackets that each form an L shape. In some examples, the brackets may be straight, such that plates 206 and 210 would sandwich around bars of a lift truck at an orientation 90 degrees different from the orientation shown in FIGS. 5 and 6. In some examples, the brackets 202a-b would include a lower portion and an upper portion that are not in line with each other and that connect together at an angle other ninety degrees.

The implementation of mounting system 200 shown in FIGS. 5 and 6 includes two brackets 202a-b, but a single bracket may alternatively be used. The single bracket could attach to the enclosure 102 with the same four fasteners 116a-d, and include one or more cutouts to accommodate the various components that protrude from the rear side 105 of the enclosure (e.g., the power terminal 125, the USB port 118, the Ethernet port 119, the LED light 124, and the antennas 114a-b).

The brackets 202a-b may attach to the sandwich mount via vibration dampening mounts 204a-d. The mounts 204a-d may at least partially isolate the enclosure 102 from vibrations imparted to plates 206 and 210 by the lift truck 250 (e.g., high frequency vibrations). The dampening mounts 204a-d may comprise an elastic material (e.g., rubber, plastic, silicone), a mechanical spring, or a pneumatic or hydraulic dampening system. Each of the dampening mounts 204a-d may include an aperture that forms a bore through the respective mount, though which a fastener can pass to attach the corresponding bracket 202a-b to the plate 206.

Figure 7:
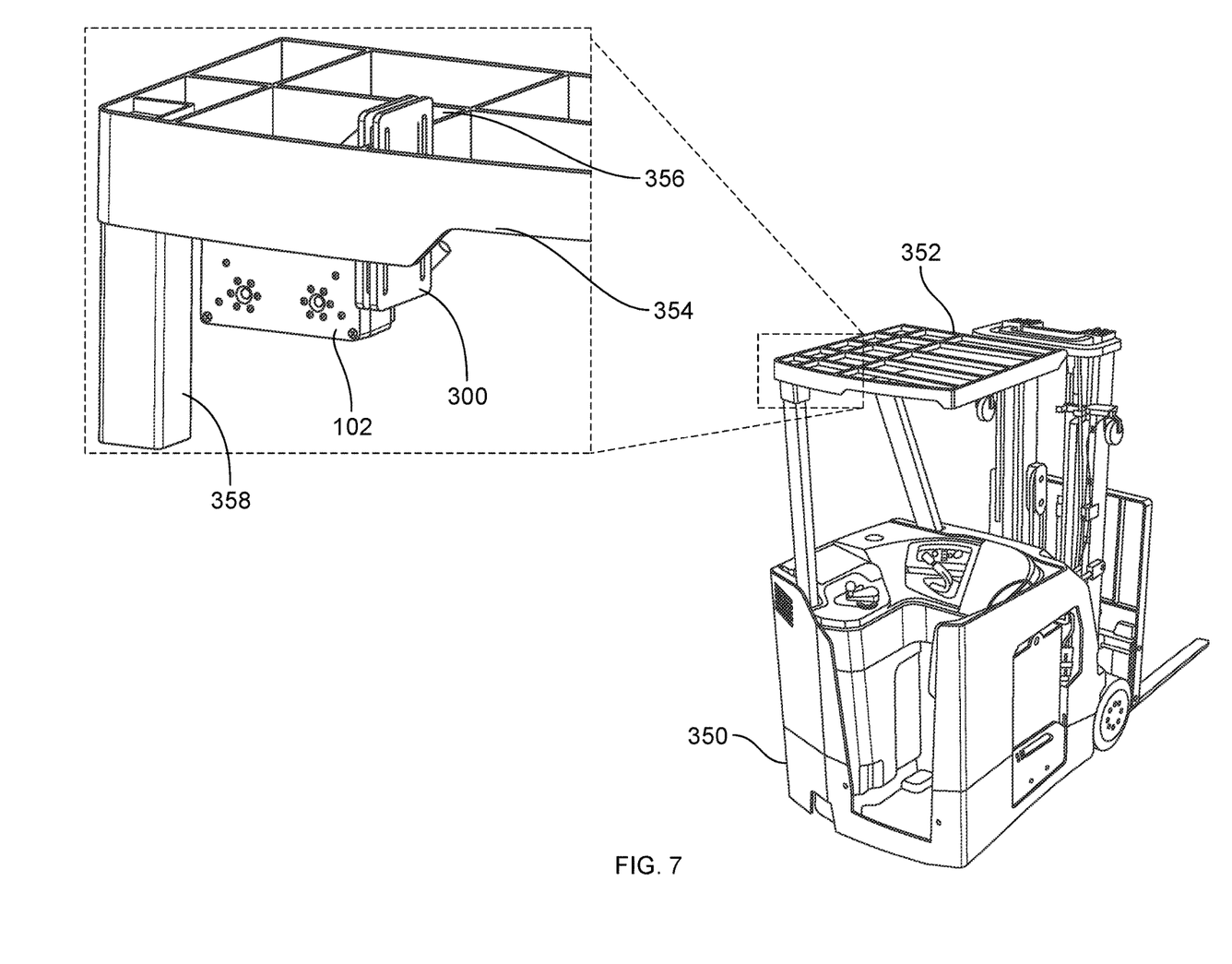
FIGS. 7 and 8 show a second mounting system designed to attach the enclosure to a different lift truck.
Figure 8:
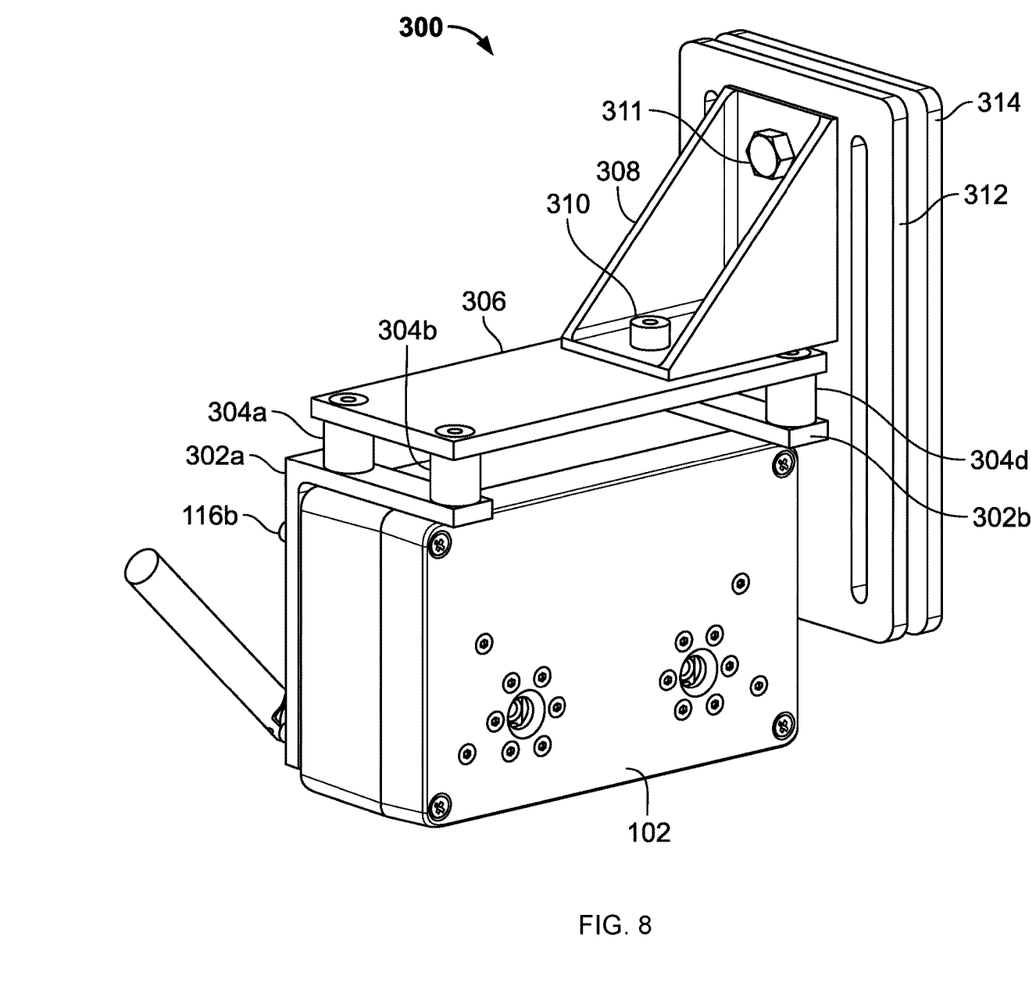

FIGS. 7 and 8 show a second mounting system 300 designed to attach the enclosure 102 to a lift truck 350. The second mounting system 300 attaches to a lift truck 350 at a protective roof grate 352 that is suspended above an operator compartment of the lift truck 350. The protective roof grate 352 includes a first vertically-oriented bar 356 that attaches at a perpendicular orientation to a second vertically-oriented bar 354. These vertically oriented bars 354 and 356 are suspended above the operator compartment through direct or indirect connection to a vertical post 358.

The second mounting system 200 attaches to the first vertically-oriented bar 356 using a sandwich mount that comprises plates 312 and 314. Plates 312 and 314 are fastened together using a fastener 311 that passes through a corresponding smooth bore aperture in plate 312 and a corresponding threaded aperture in plate 314 (or a smooth aperture in plate 314, combined with a threaded bolt). The fastener 311 may be tightened to draw plates 312 and 314 together and squeeze plates 312 and 314 around the first vertically-oriented bar 356.

The portion of the mounting system 300 that interfaces with the enclosure 102 includes brackets 302a-b. The brackets 302a-b attach to the rear portion 104b of the enclosure 102 with fasteners 116a-d that interface with corresponding apertures in the brackets 302a-b. The brackets 302a-b are illustrated as right-angle brackets that each form an L shape. In some examples, the brackets may be straight, such that plates 312 and 314 would sandwich around bars of a lift truck at an orientation 90 degrees different from the orientation shown in FIGS. 7 and 8. In some examples, the brackets 302a-b would include a lower portion and an upper portion that are not in line with each other and that connect together at an angle other than ninety degrees.

The implementation of mounting system 300 shown in FIGS. 7 and 8 includes two brackets 302a-b, but a single bracket may alternatively be used. The single bracket could attach to the enclosure 102 with the same four fasteners 116a-d, and include one or more cutouts to accommodate the various components that protrude from the rear side 105 of the enclosure (e.g., the power terminal 125, the USB port 118, the Ethernet port 119, the LED light 124, and the antennas 114a-b).

The brackets 302a-b may attach to the sandwich mount via an intermediate plate 306, which connects to the sandwich mount using a braced right angle bracket 308. The intermediate plate 306 may connect to the braced right angle bracket 308 with at least one fastener 310. The intermediate plate 306 may attach indirectly to the two brackets 302a-b via vibration dampening mounts 304a-d. These mounts 304a-d may at least partially isolate the enclosure 102 from vibrations imparted to plates 312 and 314 by the lift truck 350 (e.g., reducing high frequency vibration). The dampening mounts 304a-d may comprise an elastic material (e.g., rubber, plastic, silicone), a mechanical spring, or a pneumatic or hydraulic dampening system. Each of the dampening mounts 304a-d may include an aperture that forms a bore through the respective mount, though which a fastener can pass to attach the corresponding bracket 302a-b to the intermediate plate 306.

Schematic

Figure 9:
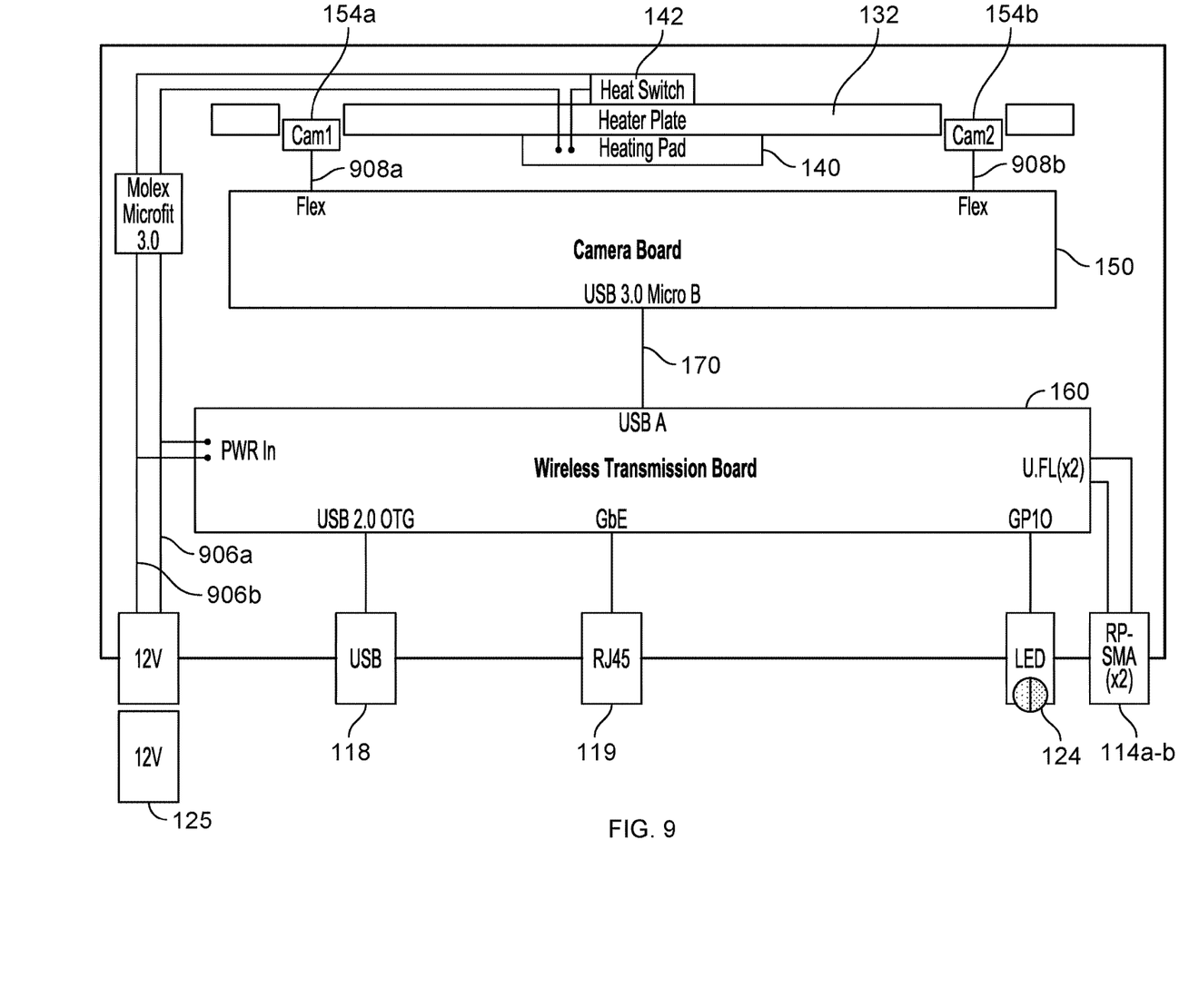
FIG. 9 shows a schematic diagram of the electronic components of the image sensing assembly.

FIG. 9 shows a schematic diagram of the electronic components of the image sensing assembly. The camera board 150 is a rigid printed circuit board that connects to the two image sensors 154a-b using two respective flexible circuit boards 908a-b. The camera board 150 may include a processor (not shown) to process image data captured by the image sensors 154a-b and prepare that image data for transmission over the USB cable 170 to the wireless transmission board 160. The processor may also analyze signals generated by a temperature sensor to determine whether to active or deactivate the heat switch 142 (although the heat switch may operate without external communication/control in some implementations).

The wireless transmission board 160 may be a rigid printed circuit board. Mounted to the wireless transmission board 160 may be an additional processor to interface with external systems through various mechanisms, in order to transmit the image data, transmit position/movement data from an IMU (not shown), and enable programming and diagnostic access to components of the electrical system. Diagnostic access to the system may allow users to change heating parameters, image capture settings, and wireless transmission settings.

The two antennas 114a-b are one of the mechanisms by which the additional processor may interface with external systems. For example, the additional processor may receive the image data and the IMU data, and modulate that data into a form suitable for wireless transmission using one or more of the antennas 114a-b. Additional mechanisms by which the additional processor may interface with external systems includes the USB port 118 and the Ethernet port 119. An additional electronic component connected to the wireless transmission board is the LED light 124, which may indicate whether the system is powered on and/or whether the system is wirelessly connected with external systems and able to transmit image data.

The wireless transmission circuit board may receive electrical power via electrical lines 906a-b that receive power through a 12V power terminal 125. The camera board 150 may receive its power through the USB cable 170, or through a direct connection to the electrical lines 906a-b (not shown).

The heating pad 140 may receive electrical power through the electrical lines 906a-b, with a heat switch 142 positioned in series with electrical line 906b to switch power on and off in response to either an instruction from a controller, or receipt of a signal from an electrical circuit that outputs different signal levels based on resistive characteristics of the temperature sensor.

This disclosure sometimes refers to groups of components using a nomenclature in which the group is referenced with a number (e.g., 108) and different items in the group are referenced with lower case alphabetical letters that follow the number (e.g., 108a-d). For example, fasteners 108a-d are illustrated in FIG. 1 with separate labels 108a, 108b, 108c, and 108d. In some examples in which it is difficult to label all items in a group, some items in a group may not be labelled when the labelling for non-labelled items would be apparent. This may be the case, even though the specification may reference the group of items as though all items were labelled. As an example, the apertures 110a-b in FIG. 1 are each surrounded by six fasteners. While the fasteners that surround aperture 110a are labelled 112a-f, the fasteners that surround aperture 110b are only partially labelled (fastener 112g and 112l are labeled, but the remaining four fasteners 112h-k are not labelled), in order to limit the number of labels in the figure.

Some of the figures similarly do not include labels for some items in a group (even though the labels for the entire group are discussed in the description), because some of the items in the group are not visible in the figures. For example, the description references apertures 121a-d, but FIG. 3 only includes labels for apertures 121a and 121b because the apertures for 121c and 121d are not visible in the figures.

The locations of apertures 121c and 121d are discernable to a skilled artisan, and the application therefore references the entire group of apertures 121a-d.

This disclosure typically refers to the image sensing assembly and the constituent components in an assembled form, but a skilled artisan would understand that the components may be separated (e.g., as shown in the exploded diagram of FIG. 3). As such, this disclosure is intended to cover a collection of components that when assembled form the image sensing assembly described and illustrated in this disclosure, or a portion thereof (e.g., the enclosure and components therein, without either of the mounting systems). As an example, discussion of a fastener that has been inserted into an aperture should be understood to provide disclosure of the same fastener that is "insertable" into the same aperture, and like terminology. Discussion of a circuit board that is fastened to the enclosure with a fastener should be understood to provide disclosure of the same circuit board, enclosure, and fastener in their unassembled form.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination. Although a few implementations have been described in detail above, other modifications are possible. Moreover, other mechanisms for performing the systems and methods described in this document may be used. Accordingly, other implementations are within the scope of the following claims.

What is claimed is:

1. An image-sensing assembly, comprising:
    an enclosure that defines a first viewport aperture in a front wall of the enclosure, wherein the enclosure includes a front portion and a rear portion releasably attached to each other, the front portion including the front wall and the rear portion including a rear wall;
    a first image sensor attached within the enclosure, the first image sensor aligned with the first viewport aperture in the front wall of the enclosure to capture image data representative of a scene viewed through the first viewport aperture;
    a bracket attached to the enclosure at a first portion of the bracket and attached to a first mounting plate at a second portion of the bracket;
    a mount located between the bracket and the first mounting plate;
    wireless transmission circuitry to transmit the image data captured by the first image sensor; and
    a first circuit board to which the wireless transmission circuitry is attached, the first circuit board located within the enclosure and removably attached to the rear wall of the enclosure with multiple circuit board fastening fasteners.

2. The image-sensing assembly of claim 1, wherein the mount is a vibration dampening mount adapted to at least partially isolate the enclosure from vibration of the first mounting plate.

3. The image-sensing assembly of claim 1, wherein the mount defines an aperture that forms a bore through the mount, the bore being adapted to receive a fastener to attach the bracket to the first mounting plate.

4. The image-sensing assembly of claim 1, wherein:
    the rear wall of the enclosure defines multiple bracket fastening apertures; and
    the bracket is removably attached to the enclosure at the rear wall of the enclosure using multiple bracket fastening fasteners that pass through the multiple bracket fastening apertures.

5. The image-sensing assembly of claim 4, wherein:
    the first portion of the bracket is angled with respect to the second portion of the bracket at a first angle; and
    the rear wall of the enclosure is angled with respect to the first mounting plate at the first angle.

6. The image-sensing assembly of claim 5, wherein:
    the first angle is approximately 90 degrees;
    the enclosure includes a top wall located between the front wall of the enclosure and the rear wall of the enclosure; and
    the first mounting plate is oriented parallel to the top wall of the enclosure.

7. The image-sensing assembly of claim 1, wherein:
    the image-sensing assembly comprises a second mounting plate and a third mounting plate that are attached to the first mounting plate with a second bracket;
    the second mounting plate is removably attached to the third mounting plate with multiple mounting plate fasteners; and
    the second mounting plate, the third mounting plate, and the multiple mounting plate fasteners form a sandwich mount.

8. The image-sensing assembly of claim 7, wherein the second bracket retains the second mounting plate in a perpendicular orientation with respect to the first mounting plate.

9. The image-sensing assembly of claim 8, wherein:
    the second mounting plate and the third mounting plate are oriented parallel to each other; and
    the first mounting plate is oriented perpendicular to both the second mounting plate and the third mounting plate.

10. The image-sensing assembly of claim 1, wherein:
    the front portion of the enclosure and the rear portion of the enclosure are releasably attached to each other to enclose an interior of the enclosure;
    the image-sensing assembly comprises a gasket to seal the front portion of the enclosure to the rear portion of the enclosure, the gasket surrounding the interior of the enclosure;
    the enclosure defines multiple enclosure fastening apertures;
    the image-sensing assembly comprises multiple enclosure fastening fasteners that pass through the multiple enclosure fastening apertures to releasably attach the font portion of the enclosure to the rear portion of the enclosure; and
    the multiple enclosure fastening fasteners are positioned outside of the gasket such that the multiple enclosure fastening apertures are positioned outside the interior of the enclosure.

11. The image-sensing assembly of claim 1, wherein:
the enclosure defines a second viewport aperture in the front wall of the enclosure;
the image-sensing assembly comprises a second image sensor attached within the enclosure; and
the second image sensor is aligned with the second viewport aperture in the front wall of the enclosure.

12. The image-sensing assembly of claim 1, wherein:
the first image sensor is attached to a structure that is located within the enclosure and that is removably attached to the front wall of the enclosure with multiple structure fastening fasteners, the structure comprising a second circuit board.

13. The image-sensing assembly of claim 12, comprising a communication cable that communicatively connects the second circuit board to the first circuit board to transmit the image data captured by the first image sensor to the wireless transmission circuitry, the communication cable being releasably attached to the second circuit board or the first circuit board.

14. The image-sensing assembly of claim 13, wherein:
the rear portion of the enclosure defines an antenna receiving aperture; and
the wireless transmission circuitry includes an antenna that communicatively connects to the first circuit board and that extends through the antenna receiving aperture so that at least part of the antenna is located external to the enclosure.

15. The image-sensing assembly of claim 14, wherein:
the rear portion of the enclosure defines a power-supply receiving aperture;
the image-sensing assembly comprises a power supply cable or terminal to receive power from a power source external to the enclosure; and
the power supply cable or terminal extends at least partially through the power-supply receiving aperture.

16. The image-sensing assembly of claim 15, comprising a transparent panel positioned between the first image sensor and the front wall of the enclosure, the transparent panel aligned with the first image sensor and the first viewport aperture in the front wall of the enclosure.

* * * * *